United States Patent
Chinoy et al.

(10) Patent No.: US 9,984,354 B1
(45) Date of Patent: May 29, 2018

(54) CAMERA TIME SYNCHRONIZATION SYSTEM

(71) Applicant: AMAZON TECHNOLOGIES, INC., Seattle, WA (US)

(72) Inventors: Ammar Chinoy, Seattle, WA (US); Joachim Sebastian Stahl, Sammamish, WA (US); Frank Florian Liberato, Jr., Kirkland, WA (US); Yasser Baseer Asmi, Redmond, WA (US); Daniel Bibireata, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/501,726

(22) Filed: Sep. 30, 2014

(51) Int. Cl.
*G06K 9/00* (2006.01)
*G06Q 10/08* (2012.01)
*G06K 7/10* (2006.01)
*H04N 5/06* (2006.01)
*G06K 19/06* (2006.01)

(52) U.S. Cl.
CPC ......... *G06Q 10/087* (2013.01); *G06K 7/1092* (2013.01); *G06K 19/06037* (2013.01); *H04N 5/06* (2013.01)

(58) Field of Classification Search
CPC .............. G06Q 10/087; G06K 7/1092; G06K 19/06037; H04N 5/06
See application file for complete search history.

(56) References Cited

U.S. PATENT DOCUMENTS

| | | | | |
|---|---|---|---|---|
| 4,268,826 A * | 5/1981 | Scott | ..................... | G06F 3/0386 341/20 |
| 4,896,337 A * | 1/1990 | Bushy, Jr. | ............. | H03L 7/0992 327/261 |
| 7,225,980 B2 | 6/2007 | Ku et al. | | |
| 7,949,568 B2 | 5/2011 | Fano et al. | | |
| 8,009,864 B2 | 8/2011 | Linaker et al. | | |
| 8,189,855 B2 | 5/2012 | Opalach et al. | | |
| 8,630,924 B2 | 1/2014 | Groenevelt et al. | | |
| 9,235,928 B2 | 1/2016 | Medioni et al. | | |
| 2011/0011936 A1 | 1/2011 | Morandi et al. | | |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

(Continued)

*Primary Examiner* — David F Dunphy
(74) *Attorney, Agent, or Firm* — Lindauer Law, PLLC

(57) ABSTRACT

Systems involving a plurality of cameras with clocks may not remain time synchronized during operation. Described in this disclosure are techniques for synchronizing one or more of the clocks of a plurality of cameras or the images produced by the plurality of cameras. In one implementation, a timestamp projector produces an optical timestamp encoding data indicative of timing. One or more cameras may acquire images of a scene that include the optical timestamp. The images may be processed to recover the data indicative of timing. This data may be used to set the clock of the camera, set timestamps associated with the images for subsequent use, and so forth.

21 Claims, 8 Drawing Sheets

(56) References Cited

U.S. PATENT DOCUMENTS

| | | | |
|---|---|---|---|
| 2011/0207531 A1* | 8/2011 | Gagner | G07F 17/3248 463/30 |
| 2012/0044358 A1* | 2/2012 | Thomason | H04N 1/00204 348/175 |
| 2012/0284132 A1 | 11/2012 | Kim et al. | |
| 2013/0117078 A1* | 5/2013 | Weik, III | G06Q 10/00 705/13 |
| 2013/0168447 A1 | 7/2013 | Little et al. | |
| 2013/0284806 A1 | 10/2013 | Margalit | |
| 2014/0047143 A1* | 2/2014 | Bateman | H04N 7/181 710/72 |
| 2014/0295903 A1* | 10/2014 | Hatsutori | H04H 20/59 455/521 |
| 2015/0086107 A1 | 3/2015 | Dedeoglu et al. | |
| 2015/0254486 A1* | 9/2015 | Shigemitsu | G06F 3/00 235/462.11 |

OTHER PUBLICATIONS

Pop, Christian "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

CAMERA TIME SYNCHRONIZATION SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility. This monitoring may be provided using sensors, such as cameras.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
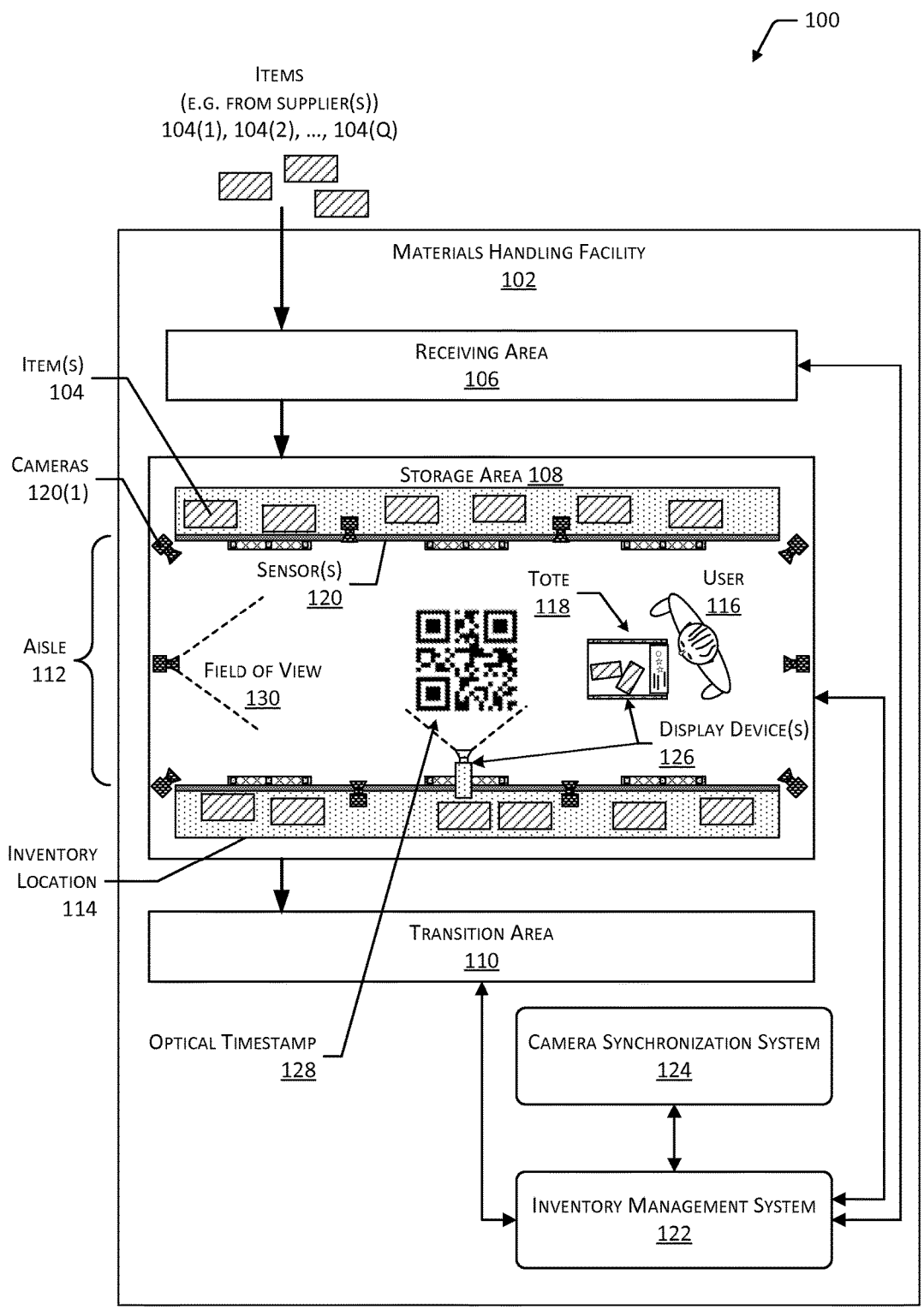
FIG. 1 is a block diagram illustrating a materials handling facility (facility) having cameras configured to be time synchronized using one or more optical timestamps, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for synchronizing timing of images acquired by cameras, which may be used in a materials handling facility (facility) or other setting. The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. Operation of the facility may be facilitated by using one or more cameras to acquire images of objects in the facility. For example, the images may be used to track or identify objects, such as users, items, and so forth.

Synchronization of timing across cameras and the images produced by those cameras may facilitate operation of the facility. For example, processing of images obtained from multiple cameras of the same event may be facilitated by providing as input those images obtained at the same time. Loss of synchronization of the images may result in erroneous results. For example, images acquired before or after the event may be erroneously processed when the data about the timing of those images is incorrect. Thus, it is beneficial to maintain time synchronization across at least a portion of the cameras in the facility.

Time synchronization (synchronization) may be maintained between one or more of the cameras or at a device configured to process the images produced by the cameras. An optical timestamp is generated that includes one or more duplicates of a machine-readable code encoded time data. The time data may comprise a value indicative of a time relative to an epoch, a counter value, and so forth. In one implementation, the time data may be indicative of an authoritative time standard, such as provided by clocks of the National Institute of Standards and Technology (NIST). In another implementation, the time data may be relative, such as using an internal clock without regard to authoritative standards.

The machine-readable code may comprise a two-dimensional matrix code, a one-dimensional barcode, or other feature or set of features that may be decoded without human intervention. The optical timestamp is presented in the facility within the field of view of one or more of the cameras. For example, an image projector may be used to project the optical timestamp onto a floor of the facility. In another example, an image of the optical timestamp may be presented using other display devices in the facility, such as addressable displays, light arrays, and so forth. The optical timestamp may be updated or presented at a rate of display that renders it imperceptible or unintelligible to the human eye. For example, the optical timestamp may change every 20 milliseconds, too quick to be accurately perceived by the human eye.

In some implementations, the optical timestamp may be presented using wavelengths otherwise invisible to the human eye. For example, the optical timestamp may be projected using infrared (IR) light, while the cameras may be configured to detect the IR light as projected.

As the cameras acquire image data of scenes within the facility, they may also acquire within those images appearances of the optical timestamps. The acquired image data may be processed. Upon detection of the optical timestamp, the machine-readable code may be decoded to produce decoded time data as output. The decoded time data may then be used in one or more ways. In one implementation, the decoded time data may be used to set the clock of the camera that generated the image data. In another implementation, the decoded time data may be associated with the image data and used to provide the timing for processing the image data, instead of a timestamp associated with the image data. In yet another implementation, the decoded time data may be used to determine time variance data. The time variance data may then be used to adjust the timing information provided by a particular camera or group of cameras.

The optical timestamp may also be used to generate diagnostic data about the cameras. For example, a malfunctioning camera may be detected by presence of an unchanging optical timestamp in the image data provided by that camera. The optical timestamp may also be used to authenticate the image data. For example, the optical timestamp may encode time data such as the date, time, hour, minute, and second. Presence of this information in the image data may be used to authenticate that the image data has not been tampered with. Furthermore, when different optical timestamps appear in different frames of the image data, tampering with the image data such as by inserting or removing frames may become evident.

As used herein, the facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. For example, the techniques and systems described may be used in theaters, stadiums, within vehicles, or other places that may employ a plurality of cameras.

By using the techniques and systems described herein, time associated with image data acquired from the plurality of cameras may be synchronized. Once synchronized, the image data may be used to track objects such as items of inventory, totes, users, and so forth, or provide other services to users or processes of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), ..., 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), ..., 116(U) and totes 118(1), 118(2), ..., 118(T) or other material handling apparatus may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the tote 118 may include a basket, a cart, a bag, and so forth. The tote 118 is discussed in more detail below with regard to FIG. 5. In other implementations, other material handling apparatuses such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, cameras, three-dimensional (3D) sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain cameras 120(1) configured to acquire images of picking or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking the location of objects within the facility 102, their movement, and so forth. For example, a series of images acquired by the camera 120(1) may indicate removal of an item 104 from a particular inventory location 114 by the user 116 and placement of the item 104 on or at least partially within the tote 118. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from information or actions which are based on input from cameras 120(1) that are time synchronized. For example, time synchronized images may be used to track pick or placement of an item 104 using a plurality of cameras 120(1).

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include cameras 120(1) configured to acquire image data of scenes in the facility 102. The image data may be processed by the inventory management system 122 to determine a location of the user 116, the tote 118, identity of the user 116, and so forth. The sensors 120 are discussed in more detail below with regard to FIG. 2.

The inventory management system 122 may utilize a camera synchronization system 124 to provide time synchronization across one or more of the cameras 120(1) or the image data acquired by the cameras 120(1). The camera synchronization system 124 may be configured to use one or more display devices 126 to present one or more optical timestamps 128. The display devices 126 may include image projectors, addressable displays able to present images, light arrays, and so forth. The display devices 126 are described in more detail below with regard to FIG. 2.

The optical timestamp 128 comprises a machine-readable code storing encoded data. For example, the machine-readable code may comprise a bar code, matrix code, and so forth. The machine-readable code may use a plurality of colors to encode data. For example, the machine-readable code may use black and white symbology, or may use one or more additional colors. In some implementations the machine-readable code may also be readable by a human. For example, the machine-readable code may include a font or glyphs suitable for optical character recognition, such as the Arabic numerals "0" through "9". The encoded data may comprise time data. The time data comprises information indicative of time relative to a designated epoch, as a counter value, and so forth. In one implementation, the time data may indicate the time relative to an epoch such as Jan. 12, 1997 at 09:00:00.00 (hours:minutes:seconds). In another implementation, the time data may be based on a counter configured to continuously recycle. For example, an 8-bit counter having decimal values equivalent to 0 to 255 of a second may generate the time data.

The encoded data of the optical timestamp 128 may include other information. For example, the encoded data may include a serial number indicative of the particular optical timestamp 128. In another example, the encoded data may include a device identifier indicative of the display device 126 presenting the image of the optical timestamp 128.

In some implementations, the clock used to generate the time data may be associated with or based on an authoritative time standard such as provided by clocks of the NIST. In another implementation, the time data may be relative, such as using an internal clock without regard to external standards.

The optical timestamp 128 as presented may be within a field of view 130 of one or more of the cameras 120(1). As the cameras 120(1) acquire image data of the scene, they may also acquire at least a portion of the optical timestamp 128 as presented by one or more of the display devices 126. The image data may then be processed to decode the time data encoded therein. The decoded time data may then be used to set a clock onboard the camera 120(1), to determine the time associated with the image data, and so forth. For example, the inventory management system 122 may use the decoded time data to process the image data, rather than a timestamp present in metadata of image data that may be unreliable due to drift in the clock onboard the camera 120(1).

In some implementations, a display device 126 using an onboard clock may generate the optical timestamp 128. The onboard clock may be set from an external source, such as a Network Time Protocol (NTP) server. In other implementations, the optical timestamp 128 may be generated by another device, such as a server, which may then use the display device 126 to present the optical timestamp 128.

By using the optical timestamp 128 to maintain time synchronization across the image data acquired by the cameras 120(1), large numbers of cameras 120(1) may be readily synchronized without the overhead or complexity associated with other techniques. As a result of the improved time synchronization, the operation of the inventory management system 122 may be improved.

Figure 2:
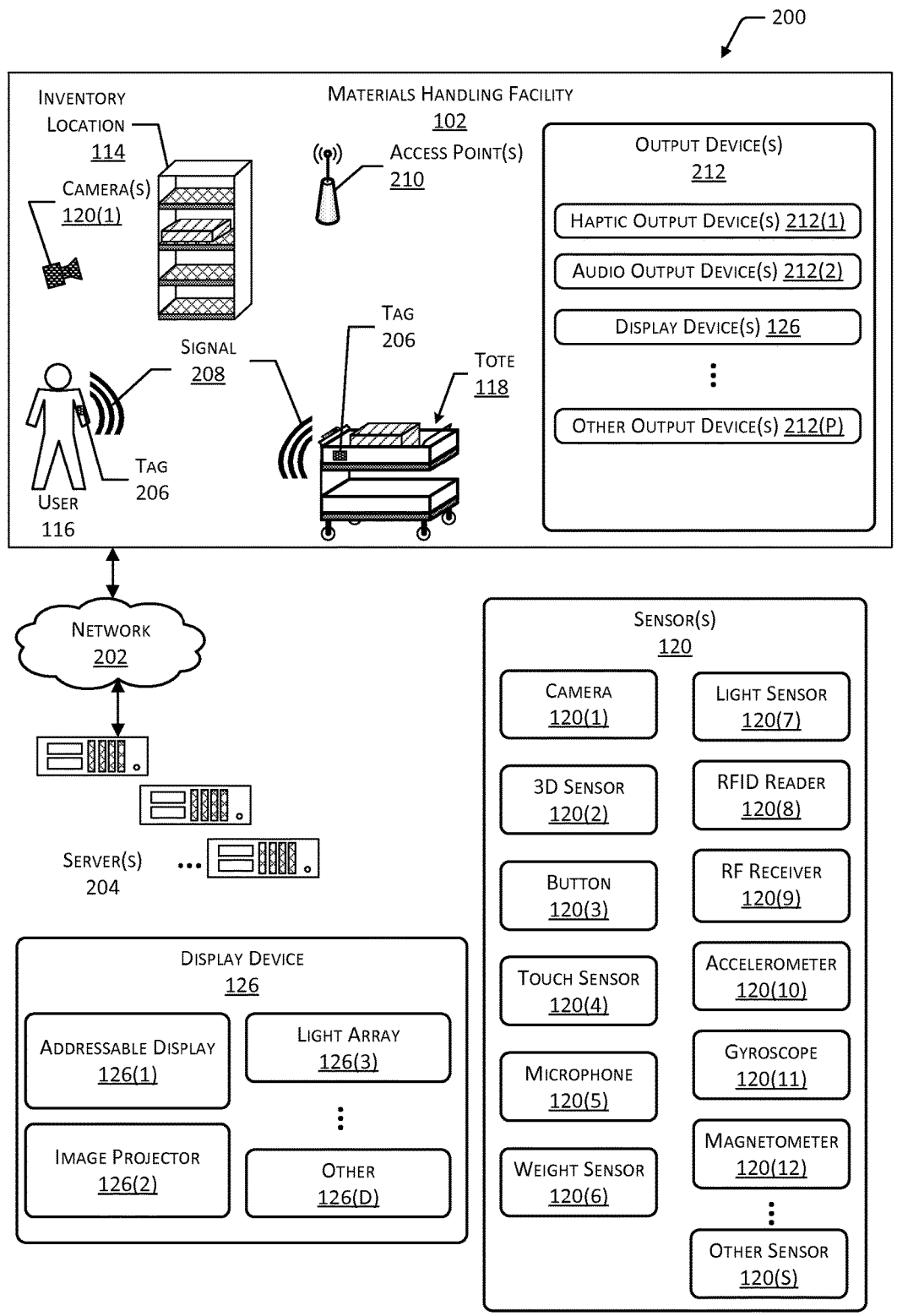
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122, the camera synchronization system 124, and so forth. While the servers 204 are illustrated as being in a location outside of the facility 102, in other implementations, at least a portion of the servers 204 may be located at the facility 102. The servers 204 are discussed in more detail below with regard to FIG. 5.

The users 116, the totes 118, or other objects in the facility 102 may be equipped with one or more tags 206. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence of the tag 206. For example, an acoustic tag 206 may be configured to generate an ultrasonic signal 208, which is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear RF tags 206, the totes 118 may have RF tags 206 affixed, and so forth, which may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth.

The sensors 120 may include one or more cameras 120(1). The one or more cameras 120(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The camera synchronization system 124 may be used to generate timing data about the cameras 120(1). The cameras 120(1) may be mounted in various locations within the facility 102. For example, cameras 120(1) may be mounted overhead, on inventory locations 114, may be worn or carried by users 116, may be affixed to totes 118, and so forth.

One or more 3D sensors 120(2) may also be included in the sensors 120. The 3D sensors 120(2) are configured to acquire spatial or 3D data, such as depth information, about objects within a field of view 130 of a sensor 120. The 3D sensors 120(2) include range cameras, lidar systems, sonar systems, radar systems, structured light systems, stereo vision systems, optical interferometry systems, and so forth. The lidar system may include a laser, a detector suitable for the light generated by the laser, and an optical scanning assembly. The optical scanning assembly may be configured to direct a beam of light from the laser to a plurality of points in 3D real space as well as direct laser light as reflected or fluoresced by an object at the plurality of points back to the detector. The lidar system or other 3D sensors 120(2) may be configured to generate a set of coordinates in 3D real space of objects in the facility 102. In some implementations, the 3D sensors 120(2) that emit light, such as a structured light system, lidar system, and so forth, may be configured to present the optical timestamp 128. The inventory management system 122 may use the 3D data acquired to identify objects, determine a location of an object in 3D real space, and so forth.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7). The light sensors 120(7) may be configured to provide information associated with ambient lighting conditions such as a level of illumination. Information acquired by the light sensors 120(7) may be used by the camera synchronization system 124. For example, the intensity of illumination of the optical timestamp 128 may be adjusted responsive to the level of lighting present in the facility 102.

One more radio frequency identification (RFID) readers 120(8), near field communication (NFC) systems, and so forth, may be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and different RFID readers 120(8) having locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi™ Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) provides information indicative of rotation of an object affixed thereto. For example, the tote 118 or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

The sensors 120 may include other sensors 120(S) as well. For example, the other sensors 120(S) may include proximity sensors, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114, which is overheating, too dry, too damp, and so forth.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks and the network 202. The access points 210 may use Wi-Fi™, NFC, Bluetooth®, or other technologies to establish wireless communications between a device and the network 202. The wireless networks allow the devices to communicate with one or more of the sensors 120, the inventory management system 122, the camera synchronization system 124, the display devices 126, the tag 206, a communication device of the tote 118, or other devices.

Output devices 212 may also be provided in the facility 102. The output devices 212 are configured to generate signals, which may be perceived by the user 116 or detected by the sensors 120. In some implementations, the output devices 212 may be used to present the optical timestamp 128.

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration, which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to: voice coils, piezoelectric elements, magnetorestrictive elements, electrostatic elements, and so forth. For example, a piezoelectric buzzer or a speaker may be used to provide acoustic output.

The display devices 126 may be configured to provide output, which may be seen by the user 116 or detected by a light-sensitive detector such as a camera 120(1) or light sensor 120(7). In some implementations, the display devices 126 may be configured to produce output in one or more of infrared, visible, or ultraviolet light. The output may be monochrome or color (multiple wavelengths).

The display devices 126 may be emissive, reflective, or both. An emissive display device 126, such as using light emitting diodes (LEDs), is configured to emit light during operation. In comparison, a reflective display device 126, such as using an electrophoretic element, relies on ambient light to present an image. Backlights or front lights may be used to illuminate non-emissive display devices 126 to provide visibility of the output in conditions where the ambient light levels are low.

The display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 126 may use a light source and an array of MEMS-controlled mirrors to selectively directly light from the light source to produce an image. These mechanisms are configured to emit light, modulate incident light emitted from another source, or both. The display devices 126 may operate as panels, projectors, and so forth.

The display devices 126 may be configured to present images. For example, the display devices 126 may comprise an addressable display 126(1). The addressable display 126(1) comprises elements that may be independently addressable to produce output, such as pixels. For example, the addressable display 126(1) may produce an image using a two-dimensional array of pixels.

In some implementations, the display devices 126 may be configured to provide non-image data, such as text characters, colors, and so forth. For example, an addressable display 126(1) may comprise a segmented electrophoretic display device 126, segmented LED, and so forth, and may be used to present information such as a stock keeping unit (SKU) number, the optical timestamp 128, and so forth. The display devices 126 may also be configurable to vary the color of the segment, such as using multicolor/multi-wavelength LED segments.

The display devices 126 may include image projectors 126(2). For example, the image projector 126(2) may be configured to project an image onto objects. The image may be generated using MEMS, LCOS, lasers, and so forth. In some implementations, a timestamp projector may comprise one or more hardware processors, memory such as computer-readable storage media, one or more communication interfaces, and one or more image projectors 126(2). The timestamp projector may be configured to present the optical timestamp 128. The timestamp projector may receive time data from another source, such as the server 204, or from an authoritative source such as a Network Time Protocol server.

The display devices 126 may include a light array 126(3). The light array 126(3) may comprise a plurality of discrete emissive elements configurable to emit light. The discrete emissive elements (or assemblies thereof) may be separated from one another by a distance such that, when image data 334 of the light array 126(3) is acquired, one emissive element may be distinguished from another. For example, the light array 126(3) may comprise a plurality of IR LEDs separated by at least 0.5 centimeters. By selectively activating a particular combination or pattern of the LEDs, the optical timestamp 128 may be displayed.

Other display devices 126(D) may be used in the facility 102. For example, mechanical flags may be used to present the optical timestamp 128 or other information.

The display devices 126 may be located at various points within the facility 102. For example, the addressable displays 126(1) or the light arrays 126(3) may be located on inventory locations 114, totes 118, in or on the floor of the facility 102, and so forth. The image projectors 126(2) may be configured to project the optical timestamp 128 on the floor, inventory locations 114, walls, users 116, totes 118, and so forth.

Other output devices 212(P) may also be present. For example, the other output devices 212(P) may include scent/odor dispensers, document printers, 3D printers or fabrication equipment, and so forth.

The optical timestamps 128 are configurable to provide features distinguishable by the cameras 120(1). These features may or may not be distinguishable to the unaided human eye. For example, the optical timestamps 128 may emit or modify IR light but not visible light. The optical timestamps 128 may be configured to emit light or modify incident ambient light. The optical timestamps 128 may be generated using emissive elements such as LEDs, light emitting quantum dots, fluorescent lights, electroluminescent lights, and so forth. For example, IR or ultraviolet LEDs or other emitters may be used to generate the optical timestamp 128.

The optical timestamps 128 may also be presented using non-emissive elements such as electrophoretic elements, liquid crystal elements, microelectromechanical elements, cholesteric elements, interferometric elements, and so forth, which modify or interact with incident ambient light.

In some implementations, the optical timestamps 128 may be presented using visible light. The perception of the optical timestamp 128 by the users 116 of the facility 102 may be minimized using one or more techniques. In one implementation, the duration of presentation of the optical timestamp 128 may be below a threshold level. For example, the optical timestamp 128 may be presented for less than $\frac{1}{60}^{th}$ of one second. This interval may be sufficient for the cameras 120(1) to acquire an image of the optical timestamp 128 but may be insufficient to be perceptible to the user 116. Furthermore, the optical timestamp 128 may be presented at particular intervals, such as every 100 milliseconds (ms) the optical timestamp 128 may be presented for $\frac{1}{60}^{th}$ of one second. In some implementations, the optical timestamp 128 may be presented such that at least a portion of the encoded time data 344 varies at a rate greater than or equal to the frame rate acquisition by the cameras 120(1). For example, the encoded time data 344 may be configured to encode data indicative of a 10 ms time slot within a particular second. The frame rate of the cameras 120(1) may be 20 FPS, with another frame acquired every 50 ms.

In another implementation, the optical timestamp 128 may be incorporated into other presented features. For example, the optical timestamp 128 may be presented in the form of a border or other on-screen element as presented by an addressable display 126(1). In another example, the optical timestamp 128 may be embedded into other images presented by the display device 126, such as using one or more steganographic techniques.

Figure 3:
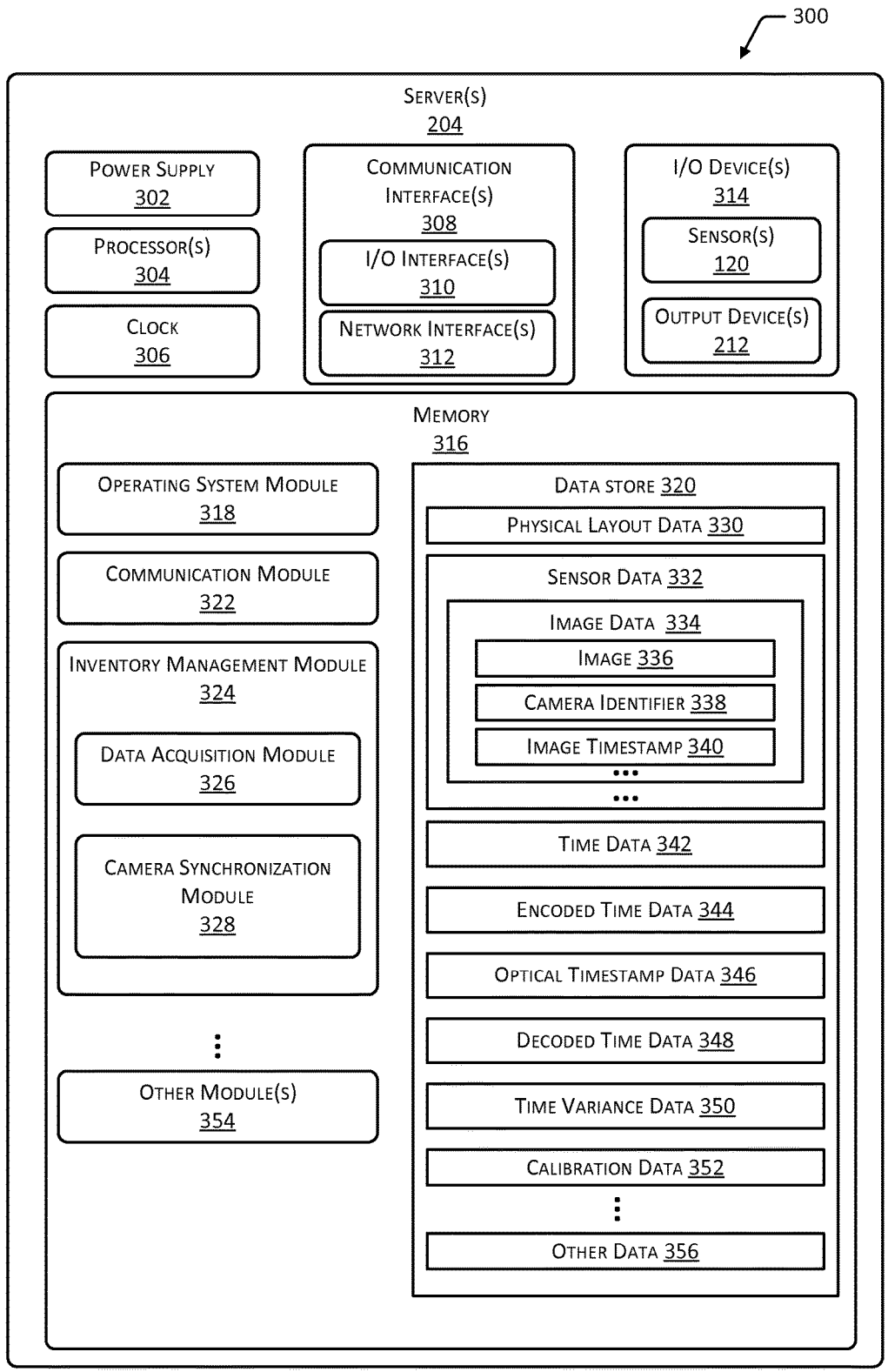
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The one or more power supplies 302 may comprise batteries, capacitors, fuel cells, photovoltaic cells, wireless power receivers, conductive couplings suitable for attachment to an external power source, and so forth. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to generate the optical timestamps 128, trigger a preprogrammed action, and so forth.

The server 204 may include one or more communication interfaces 308 such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 212 such as one or more of a display device 126, printer, audio speakers, and so forth. In some embodiments, the I/O devices 314 may be physically incorporated with the server 204 or may be externally placed.

The network interfaces 312 are configured to provide communications between the server 204 and other devices, such as the totes 118, routers, access points 210, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi™, Bluetooth®, ZigBee®, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, the sensors 120, the display devices 126, other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth. The tracking may use time data recovered from the optical timestamps 128.

The inventory management module 324 may include one or more of a data acquisition module 326 or a camera synchronization module 328. The data acquisition module 326 may be configured to acquire and access information associated with operation of the facility 102. This information may be stored in the data store 320. The inventory management module 324 may be configured to track objects in the facility 102 using physical layout data 330 and sensor data 332.

The physical layout data 330 comprises information about the physical configuration of the facility 102 or portions thereof. For example, the physical layout data 330 may include electronic representations of the physical structures in the facility 102, such as computer aided design (CAD) data of the aisle 112 configurations, inventory locations 114, information about which items 104 are in what inventory locations 114, real coordinates of display devices 126 built into the inventory locations 114, and so forth. The physical layout data 330 may include information about the presence of walls, heating ventilation and air conditioning (HVAC) equipment, location of doors and windows, and so forth.

The sensor data 332 comprises information acquired from, or based on, the one or more sensors 120. For example, the sensor data 332 may comprise 3D information about an object in the facility 102 as acquired by the 3D sensors 120(2) or weight data as acquired by the weight sensors 120(6).

As described above, the sensors 120 may include cameras 120(1) configured to acquire image data 334. The image data 334 may comprise one or more images 336. The images 336 may include individual still images 336 or a sequence of images 336 such as video. The image data 334 also comprise metadata, such as a camera identifier 338, image timestamp 340, and so forth. The image 336 may comprise a plurality of pixels.

The camera identifier 338 provides information indicative of a particular camera 120(1) that acquired the image 336. In some implementations, the time data as generated by the camera synchronization module 328 may be specific to a particular camera 120(1) that is located at a particular camera location in real space. The camera identifier 338 may comprise a string, value, or other data which uniquely identifies the particular camera 120(1) from other cameras 120(1) within at least a single facility 102. In some implementations, the camera identifier 338 may be unique across all facilities 102. In one implementation, the camera identifier 338 may comprise a MAC address, such as of a network interface used by the camera 120(1) to communicate with the network 202. By using the camera identifier 338, the data acquisition module 326, the camera synchronization module 328, and other modules are able to determine information such as time variance of the image timestamp 340 relative to the clock 306, and so forth.

The image timestamp 340 comprises time information indicative of acquisition of the image 336. The image timestamp 340 may be generated using time data from an internal clock of the camera 120(1). The image timestamp 340 comprises data extrinsic to the image 336, such as metadata or file header information. In some implementations, the image timestamp 340 may be superimposed into or provided in place of at least a portion of the image 336. For example, the image timestamp 340 may comprise date and time information as obtained from the clock of the camera 120(1) and presented as a visible caption in the image data 334.

The image data 334 may include other information. For example, where the camera 120(1) includes a mechanism to change the orientation, such as a pan/tilt head, the orientation of the camera 120(1) at the time of acquisition of the image 336 may be included in the image data 334. In some implementations, the image data 334 may include the location of the camera 120(1) in real coordinates.

The inventory management module 324 may be configured to generate time data 342. The time data 342 provides information indicative of a time, date, tick, or other temporal or sequential information. The time data 342 may be used to determine which portions of the sensor data 332 are contemporaneous with one another, with a particular event in the facility 102, to determine a sequence of events, and so forth.

In some implementations, the clock 306 used to generate the time data 342 may be associated with or based on an authoritative time standard. For example, the clock 306 may be synchronized with time signals provided by the NIST, from satellite sources such as the Global Positioning System (GPS) satellites, and so forth. In other implementations, the time data 342 may be relative, such as using data from the clock 306 without regard to external standards. For example, the clock 306 may be "free running" and subject to internal drift.

The camera synchronization module 328 is configured to use the time data 342 to generate encoded time data 344. The camera synchronization module 328 may encode the time data 342 using one or more machine-readable codes. For example, the time data 342 may be expressed as a value that is then encoded to create a barcode, matrix code, illumination pattern, and so forth. Continuing the example, the encoded time data 344 may comprise a matrix code such as the QR code originally promulgated by Denso Wave and expressed as the International Standards Organization (ISO) specification entitled "Automatic identification and data capture techniques—QR Code 2005 bar code symbology specification" ISO/IEC 18004:2006 cor. 2009. In other implementations, the encoded time data 344 may be expressed using one-dimensional bar codes, such as Code 128 variant GS1-128, also known as UCC/EAN-128. In yet another implementation, the encoded time data 344 may be expressed as a binary pattern. This binary pattern may be presented by the display devices 126 such as a set of activated or inactivated emissive elements such as LEDs, with activated lights indicative of a binary "1" and inactive lights indicative of a binary "0".

The camera synchronization module 328 is configured to generate optical timestamp data 346. The optical timestamp data 346 may comprise one or more duplicates or copies of the encoded time data 344. For example, where the encoded time data 344 comprises a bitmap image of a QR code, the optical timestamp data 346 may be configured to present several copies of the bitmap image when presented. In other implementations, the optical timestamp data 346 may include other encoded data, such as an identifier of the display device 126 presenting the optical timestamp 128.

The optical timestamp data 346 may then be used by one or more of the display devices 126 to produce the optical timestamp 128. For example, the optical timestamp data 346 may be provided to one or more image projectors 126(2) that then project an image of the optical timestamp 128 within the facility 102.

During operation of the facility 102, one or more cameras 120(1) may acquire image data 334. When the optical timestamp 128 is within a field of view 130 of the camera 120(1), the image 336 acquired by the camera 120(1) may include the optical timestamp 128 or a portion thereof.

The camera synchronization module 328 may be configured to process the image data 334 to generate decoded time data 348. For example, the camera synchronizations module 328 may detect the presence of the optical timestamp 128 within the image 336. The machine-readable code of the optical timestamp 128 may be decoded to produce decoded time data 348. The decoded time data 348 may thus be deemed to be indicative of the time at which the image 336 was acquired. As described above, the decoded time data 348 may differ from the image timestamp 340. For example, the clock on board the camera 120(1) may be set incorrectly, or may have drifted, such that the image timestamp 340 is not synchronized with time reported by clocks of the other cameras 120(1).

The camera synchronizations module 328 may associate the decoded time data 348 with the image data 334. In one implementation, the camera synchronization module 328 may replace the image timestamp 340 in the image data 334 with the decoded time data 348. In another implementation, the image timestamp 340 may be disregarded and the decoded time data 348 may instead be used for processing of the image data 334.

In some implementations, the camera synchronization module 328 may generate time variance data 350. The time variance data 350 may indicate a difference or variation between the decoded time data 348 and one or more of the image timestamp 340 or the time data 342. For example, the time variance data 350 may indicate that the image timestamp 340 is 375 ms behind the decoded time data 348.

The time variance data 350 may be associated with particular cameras 120(1). For example, where the image data 334 includes the camera identifier 338, the time variance data 350 may be determined and associated with that particular camera 120(1).

The camera synchronization module 328 may determine calibration data 352 using the time variance data 350. For example, the time variance data 350 may indicate that the cameras 120(1) within the aisle 112(1) are 215 ms ahead of the time data 342 produced by the clock 306. The calibration data 352 may thus comprise a value of −215 ms, and subsequent image data 334 may have this value added to the image timestamps 340 to produce the actual time of acquisition.

The camera synchronization module 328 may provide decoded time data 348 for all images 336 in the image data 334, or for a portion thereof. For example, the camera synchronization module 328 may generate decoded time data 348 for every nth image 336. By using the time variance data 350 and corresponding calibration data 352 generated therefrom, the intervening image data 334 for which decoded time data 348 is not generated may have their respective image timestamps 340 modified using the calibration data 352.

The calibration data 352 may be used in some implementations to adjust the clocks of the one or more cameras 120(1). For example, the calibration data 352 may be provided to the processors of the cameras 120(1) and subsequently used to reset the clocks thereof.

The camera synchronization module 328 may also be configured to coordinate refresh rate timing of the one or more display devices 126 used to present the optical timestamps 128 and frame acquisition time of one or more of the cameras 120(1). For example, the display device 126 may use an onboard clock to determine when to initiate refresh of a presented image, such as the optical timestamp 128 based on the optical timestamp data 346. Continuing the example, the camera 120(1) may use an onboard clock to determine when to acquire another frame of image data 334. In some implementations it may be advantageous to synchronize the timing of the display device 126 and the camera 120(1).

The camera synchronization module 328 may use the decoded time data 348 to generate display-camera synchronization data. The display-camera synchronization data comprises indicative of a time differential or offset value that may be used to adjust the timing of operation of one or more of the display device 126 or the camera 120(1). The display-camera synchronization data may be generated by determining at least a portion of the optical timestamp data 346 is present in an image 336. For example, where the image 336 includes only a portion of the optical timestamp 128, the timing of the camera 120(1) may be deemed to be leading the timing of the display device 126.

In some implementations, the camera synchronization module 328 may be configured to provide data or commands configured to modify the timing of one or more of the cameras 120(1) or the display devices 126. Continuing the example above where the camera 120(1) is deemed to lead the display device 126, the camera synchronization module 328 may send data to the display device 126 configured to set back or decrement the clock onboard the display device 126 by a determined interval of time.

In some implementations, one or more of the functions associated with the camera synchronization module 328 may be implemented by the camera 120(1). For example, a processor of the camera 120(1) may be configured to process the images 336 to generate the decoded time data 348 and may use the data therefrom to set the clock on board the camera 120(1). In this implementation, the image timestamp 340 in the image data 334 may thus be based on the encoded time data 344 and the optical timestamp 128 is present in the image 336.

Other modules 354 may also be present in the memory 316 as well as other data 356 in the data store 320. For example, the other modules 354 may include an analysis module while the other data 356 may include item data, user data, and so forth. The analysis module may be configured to track the movement of objects, such as items 104, users 116, totes 118, and so forth, in the facility 102, using information the sensor data 332. Other modules 354 may also generate diagnostic data based on the decoded time data 348, process user input, process orders for pick and place, and so forth.

Figure 4:
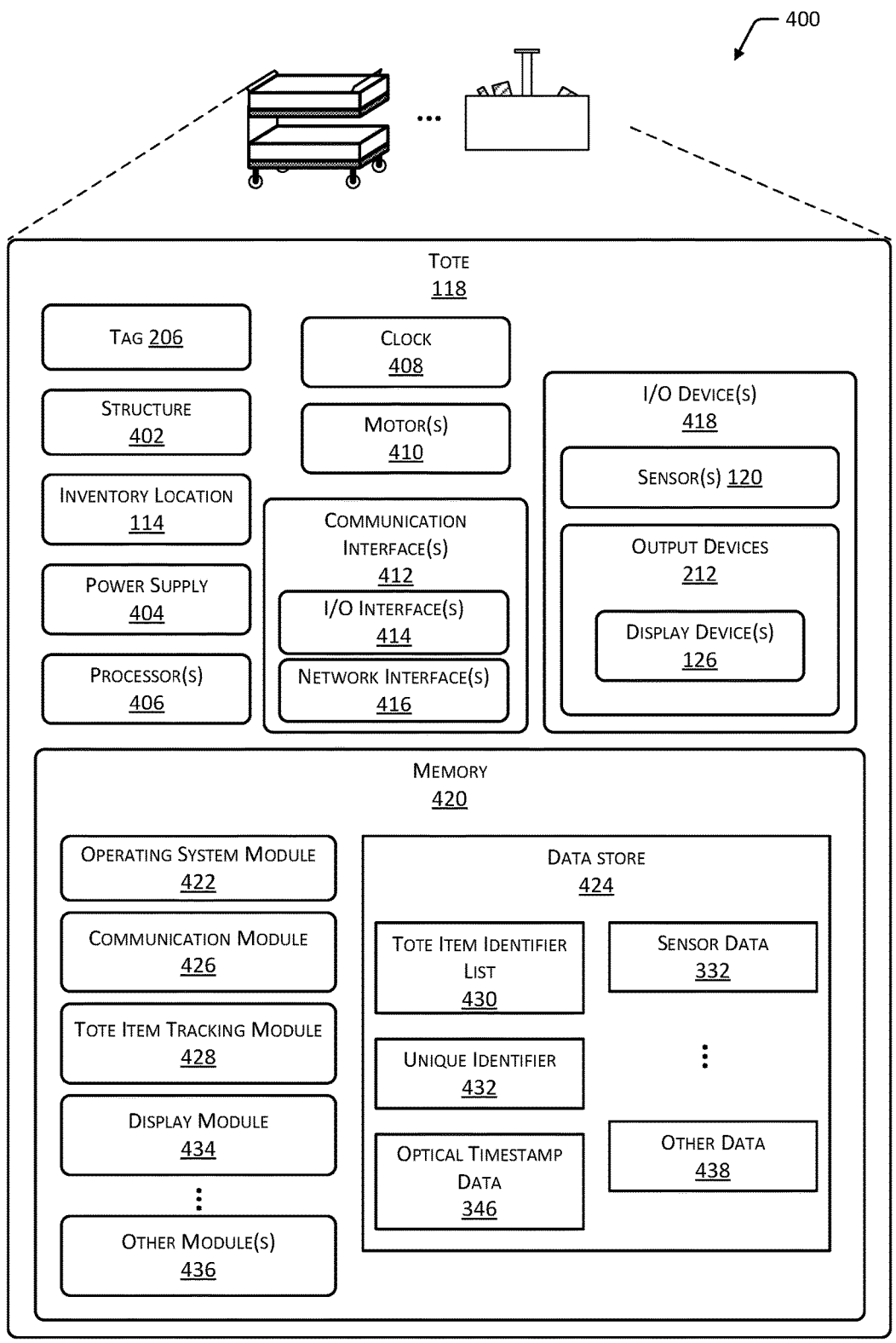
FIG. 4 illustrates a block diagram of a tote, according to some implementations.

FIG. 4 is a block diagram 400 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118.

The tote 118 may comprise a structure 402. The structure 402 may include components comprising one or more of metal, plastic, composite materials, ceramic, wood, and so forth. For example, the structure 402 may comprise a carbon-fiber frame. One or more inventory locations 114 may be integral with, or attached to, the structure 402. For example, the structure 402 may comprise a frame with wheels while the inventory location 114 comprises a basket to hold one or more items 104 during use.

The tote 118 may include a power supply 404. The power supply 404 is configured to provide electrical power suitable for operating the components in the tote 118 or coupled thereto. For example, the power supply 404 may comprise batteries, capacitors, fuel cells, photovoltaic cells, wireless power receivers, conductive couplings suitable for attachment to an external power source, and so forth.

The tote 118 may include one or more hardware processors 406 (processors) configured to execute one or more stored instructions. The processors 406 may comprise one or more cores. One or more clocks 408 may provide information indicative of date, time, ticks, and so forth. For example, the processor 406 may use data from the clock 408 to trigger a preprogrammed action, and so forth.

In some implementations, the tote 118 may include one or more motors 410 or other motive devices. The motor 410 may be configured to move or assist the user 116 in moving the tote 118 from one location to another within the facility 102. For example, in one implementation, the tote 118 may comprise a wheeled vehicle able to move within the facility 102, such as from aisle 112 to another.

The tote 118 may include one or more communication interfaces 412 such as I/O interfaces 414, network interfaces 416, and so forth. The communication interfaces 412 enable the tote 118, or components thereof, to communicate with other devices or components. The communication interfaces 412 may include one or more I/O interfaces 414. The I/O interfaces 414 may comprise I2C, SPI, USB, RS-232, and so forth.

The I/O interface(s) 414 may couple to one or more I/O devices 418. The I/O devices 418 may include one or more of the input devices such as the sensors 120. As described above, the sensors 120 may include cameras 120(1), buttons 120(3), touch sensors 120(4), accelerometers 120(10), gyroscopes 120(11), magnetometers 120(12), and so forth.

The I/O devices 418 may include the output devices 212 such as the haptic output devices 212(1), audio output devices 212(2), display devices 126, and so forth. For example, the tote 118 may comprise a display device 126 configured to present a graphical user interface to the user 116. One or more of the display devices 126 of the tote 118 may be used to present the optical timestamp 128. In some embodiments, the I/O devices 418 may be physically incorporated with the tote 118 or may be externally placed.

The network interfaces 416 are configured to provide communications between the tote 118 and other devices, such as other totes 118, routers, access points 210, the servers 204, and so forth. The network interfaces 416 may include devices configured to couple to PANs, LANs, WANs, and so forth. For example, the network interfaces 416 may include devices compatible with Ethernet, Wi-Fi™, Bluetooth®, ZigBee®, LTE, and so forth.

The tote 118 may also include one or more busses or other internal communications hardware or software that allow for the transfer of data between the various modules and components of the tote 118.

As shown in FIG. 4, the tote 118 includes one or more memories 420. The memory 420 comprises one or more CRSM as described above with regard to memory 316 on server 204. The memory 420 provides storage of computer-readable instructions, data structures, program modules, and other data for the operation of the tote 118. A few example functional modules are shown stored in the memory 420, although the same functionality may alternatively be implemented in hardware, firmware, or as a SOC.

The memory 420 may include at least one OS module 422. The OS module 422 is configured to manage hardware resource devices such as the I/O interfaces 414, the I/O devices 418, the communication interfaces 412, and provide various services to applications or modules executing on the processors 406. The OS module 422 may implement a variant of the FreeBSD™ operating system as promulgated by the FreeBSD Project; other UNIX™ or UNIX-like variants; a variation of the Linux™ operating system, such as Android® as promulgated by Google, Inc. of Mountain View, Calif., USA. Other OS modules 422 may be used, such as the Windows® operating system from Microsoft Corporation of Redmond, Wash., USA; the LynxOS® from LynuxWorks of San Jose, Calif., USA; and so forth.

One or more of the following modules may also be stored in the memory 420. These modules may be executed as foreground applications, background tasks, daemons, and so forth. The data store 424 may use a flat file, database, linked list, tree, executable code, script, or other data structure to store information. In some implementations, the data store 424 or a portion of the data store 424 may be distributed across one or more other devices including the servers 204, network attached storage devices, and so forth.

A communication module 426 may be configured to establish communications with one or more of the sensors 120, the servers 204, or other devices. The communications may be authenticated, encrypted, and so forth.

The memory 420 may also store a tote item tracking module 428. The tote item tracking module 428 is configured to maintain a tote item identifier list 430. The tote item identifier list 430 may comprise data indicating one or more items 104 associated with the tote 118. For example, the tote item identifier list 430 may indicate the items 104 present in the tote 118. The tote item tracking module 428 may generate or otherwise maintain a tote item identifier list 430. For example, the tote item tracking module 428 may receive input from a user 116 by way of a touch screen display with which the user 116 may enter information indicative of the item 104 placed in the tote 118. In another example, the tote item tracking module 428 may receive input from one or more I/O devices 418, such as the weight sensor 120(6), an RFID reader 120(8), and so forth. The tote item tracking module 428 may send the list of items 104 to the inventory management system 122. The tote item tracking module 428 may also be configured to receive information from the inventory management system 122. For example, a list of items 104 to be picked may be presented within a user interface on the display device 126 of the tote 118.

A unique identifier 432 may also be stored in the memory 420. In some implementations, the unique identifier 432 may be stored in rewritable memory, write-once-read-only memory, and so forth. For example, the unique identifier 432 may be burned into a one-time programmable, non-volatile memory, such as a programmable read-only memory (PROM). In some implementations, the unique identifier 432 may be part of a communication interface 412. For example, the unique identifier 432 may comprise a media access control (MAC) address associated with a Bluetooth® interface. The communication module 426, the tote item tracking module 428, or other modules may use the unique identifier 432 when communicating with other devices such as the server 204. For example, the unique identifier 432 may be used to identify data sent by the tote 118.

The memory 420 may include a display module 434. The display module 434 may be configured to present information, such as information received from the one or more servers 204 or generated onboard the tote 118. For example, the display module 434 may comprise a markup language rendering engine configured to process user interface data received from the server 204 to generate a user interface. In some implementations, the display module 434 may also process input made to the user interface by way of input devices, such as the sensors 120.

The display module 434 may also be configured to process optical timestamp data 346 to present the optical timestamps 128. For example, the tote 118 may comprise one or more display devices 126 such as an addressable display 126(1) or light array 126(3) onboard the tote 118. The display module 434 may be configured to present the optical timestamp 128 using the one or more display devices 126.

Other modules 436 may also be stored within the memory 420. In one implementation, a data handler module may be configured to generate data indicative of the user 116, the tote 118, or another of one or more objects in range of the sensors 120 of the tote 118. For example, the data handler module may be configured to acquire data from one or more sensors 120 of the tote 118 and generate sensor data 332. For example, the sensor data 332 may comprise information from the magnetometer 120(12) indicative of orientation of the structure 402. The sensor data 332 may be stored in the data store 424 and may be sent to the server 204 for further processing. Other data 438 may also be stored within the data store 424. For example, configuration settings, pre-stored activation sequences, user interface preferences, item data, and so forth, may be stored within the data store 424.

The other modules 436 may also include a user authentication module, which may be configured to receive input and authenticate or identify a particular user 116. For example, the user 116 may enter a personal identification number (PIN) or may provide a fingerprint to a fingerprint reader to establish their identity.

Figure 5:
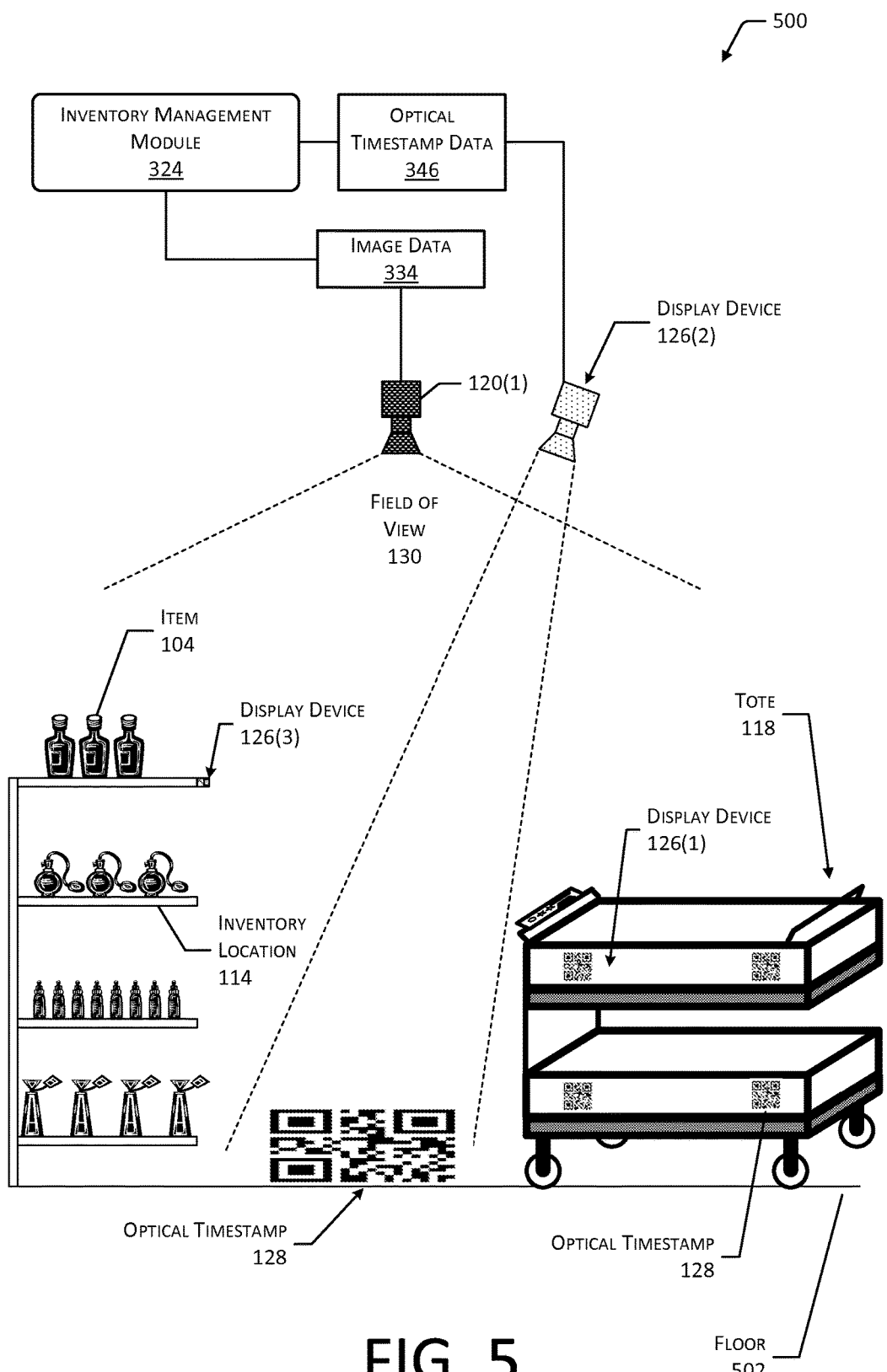
FIG. 5 illustrates presentation of optical timestamps within the facility and acquisition of image data that include the optical timestamps.

FIG. 5 illustrates a side view 500 of a portion of the facility 102 in which optical timestamps 128 are presented. In this illustration, a camera 120(1) is positioned overhead, such as above the aisle 112, and has a field of view 130 of a scene that encompasses a portion of the aisle 112. The display device 126 depicted in this illustration is an image projector 126(2), configured to project an image of the optical timestamp 128 generated from the optical timestamp data 346 onto a floor 502 of the facility 102. In other implementations, the optical timestamp 128 may be projected onto other surfaces, such as a portion of the inventory location 114, walls, the users 116, the totes 118, and so forth.

In another implementation not depicted here, the display device 126 may be within or under the floor 502. For example, the floor 502 may include a light array 126(3), such as a plurality of LEDs emplaced within the flooring.

In some implementations, another display device 126 within the same field of view 130 may present an optical timestamp 128. For example, the optical timestamp 128 may be presented by a light array 126(3) located on or affixed to one of the inventory locations 114 or by a display device 126(1) or 126(3) on the tote 118.

The same or different optical timestamps 128 may be presented by the different display devices 126. Where different optical timestamps 128 are presented, they may represent the same data. For example, the same value of time data 342 may be encoded as a QR code, Code 128 bar code, sequence of lights, and so forth.

The image data 334 acquired by the camera 120(1) may thus comprise an image 336 including one or more of the optical timestamps 128 within the field of view 130. As described above, the inventory management module 324 may be configured to determine decoded time data 348 of one or more of the images 336 in the image data 334. The decoded time data 348 may then be used for subsequent processing of the image data 334. By utilizing the techniques described above, the image data 334 from a plurality of cameras 120(1) which have fields of view 130 including the optical timestamp 128 may be synchronized with regard to time.

Figure 6:
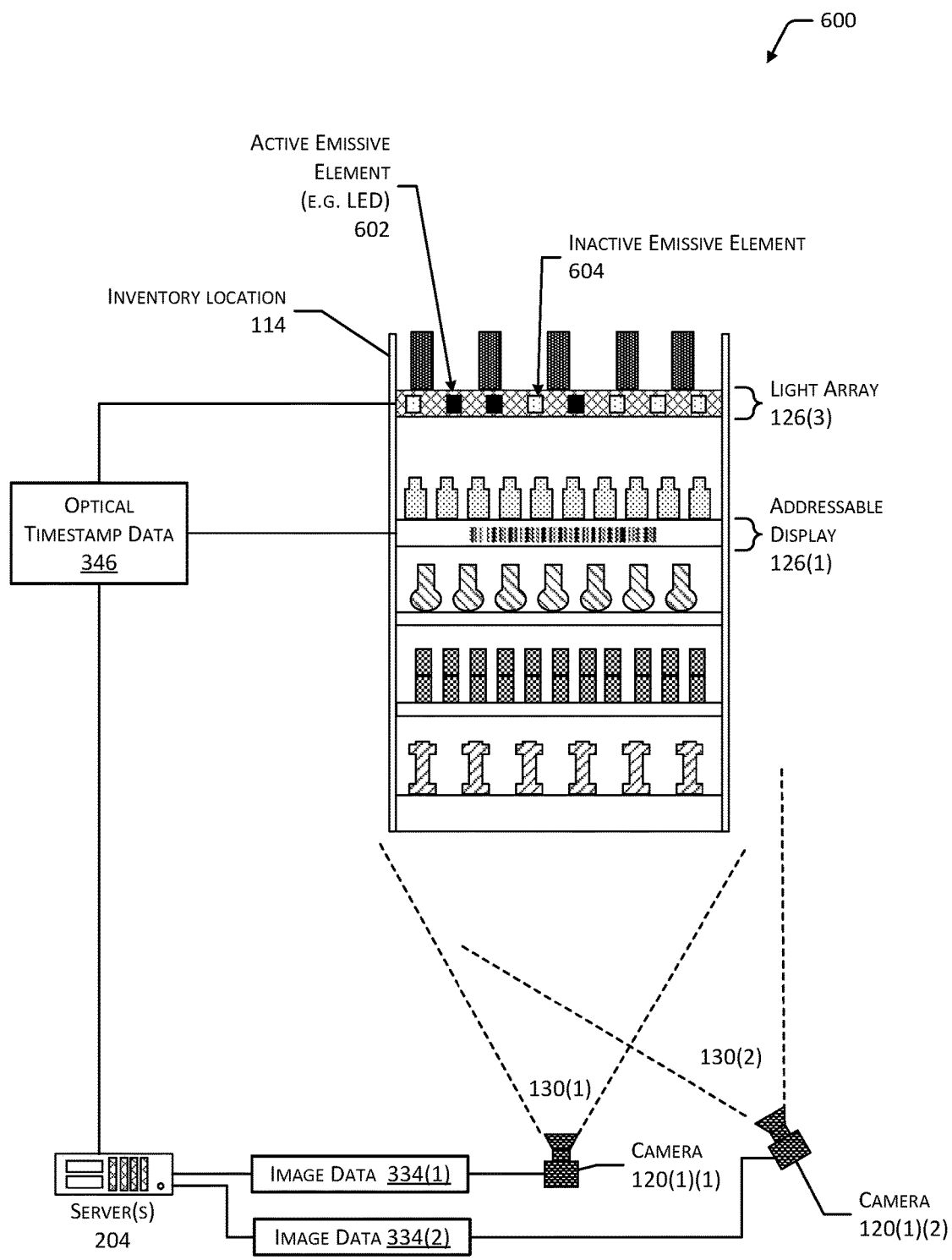
FIG. 6 illustrates a schematic of an inventory location such as a shelf with display devices configurable to present the optical timestamps, according to some implementations.

FIG. 6 illustrates a schematic 600 of an inventory location 114 such as a shelf with display devices 126 configurable to present the optical timestamps 128, according to some implementations.

The inventory location 114 may include one or more displays 126 affixed thereto or integral therewith. For example, the inventory location 114 may include one or more of the light array 126(3) or the addressable display 126(1) arranged along at least a portion of the inventory location 114, such as on a shelf edge front, on support structures, on the tip of pegs suitable for hanging items 104, and so forth.

In this illustration, the inventory location 114 includes five shelves. A front edge of one shelf includes a plurality of emissive elements, such as LEDs. The optical timestamp data 346 may be configured to produce a particular pattern of emitted light with the emissive elements. Active emissive elements 602 emit light while inactive emissive elements 604 do not. In some implementations, the optical timestamp 128 may be represented by a combination or pattern of active emissive elements 602 and inactive emissive elements 604. For example, the active emissive elements 602 may indicate a binary "1", while the inactive emissive elements 604 may indicate a binary "0". Continuing the example depicted here, the light array 126(3) represents the 8-bit binary value of "10010111".

In other implementations different wavelengths of light may be used to encode information. For example, the light array 126(3) may include one or more emissive elements able to emit light in different wavelengths, such as red, green, and blue LEDs. The optical timestamp data 346 may be presented by the light array 126(3) using selective illumination of one or more of the different wavelengths. For example, the time data 342 may designate one of three possible time slots each with a duration of 20 ms. A first time slot of 0-20 ms may be represented by activating only the red emissive element. A second time slot of 21-40 ms may be represented by activating only the green emissive element. A third time slot of 41-60 ms may be represented by activating only the blue emissive element. In some implementations the light array 126(3) may be configured to refresh or change state between the different wavelengths such that, as a human eye integrates the emitted light over time, the output appears to be a particular color such as "white" light.

Another shelf includes an addressable display 126(1). In this illustration, the addressable display 126(1) presents a barcode representative of the same value "10010111".

By incorporating one or more display devices 126 into or proximate with the inventory locations 114, those cameras 120(1) having a field of view 130 that includes the inventory location 114 may be able to acquire image data 334 that includes the optical timestamps 128. As a result, the image data 334 from these cameras 120(1) may be synchronized with regard to time.

Figure 7:
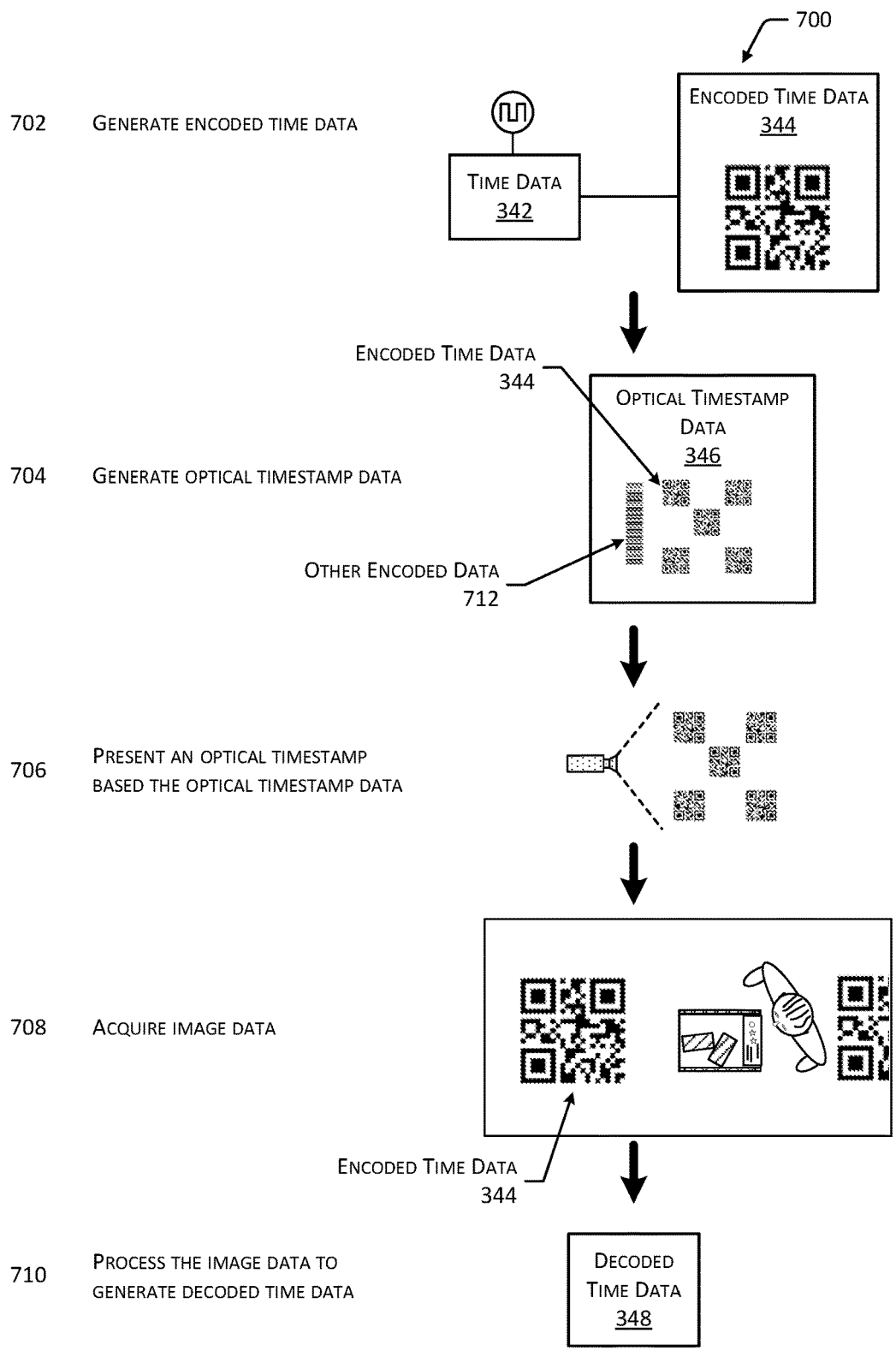
FIG. 7 depicts a scenario of generating and presenting optical timestamps and recovering the time data from images acquired in the facility, according to some implementations.

FIG. 7 depicts a scenario 700 of generating and presenting optical timestamps 128 and recovering the time data 342 from images 336 acquired in the facility 102, according to some implementations.

At 702, encoded time data 344 is generated using the time data 342. For example, the time data 342 may comprise a value based on output of the clock 306. The encoded time data 344 may be expressed in terms of a machine-readable code, such as a matrix code or barcode.

At 704, optical timestamp data 346 is generated. For example, the optical timestamp data 346 may include a plurality of the same encoded time data 344. Continuing the example, as depicted here, the optical timestamp data 346 includes five copies of the encoded time data 344. In another example, the optical timestamp data 346 may include a plurality of different encoded time data 344. For example, a first encoded time data 344(1) may encode a portion of the time data 344 such as "second", while a second encoded time data 344(1) may encode a portion of the time data 344 such as "millisecond". In some implementations, the optical timestamp data 346 may include other encoded data 712. For example, the optical timestamp data 346 may include information such as a display identifier indicative of a particular display device 126 used to present the optical timestamp 128.

At 706, the optical timestamp 128 is presented. For example, the display device 126 may process the optical timestamp data 346 and produce an image of the optical timestamp 128. In some implementations, the processing by the display device 126 may include the insertion into the image of other encoded data such as an identifier indicative of the display device 126. For example, the optical timestamp 128 may include information indicative of the display device 126 used.

In some implementations, the inventory management module 324 may use the information indicative the display device 126 as presented in the optical timestamp 128 to calibrate one or more cameras 120(1), update the physical layout data 330, or for other purposes. For example, given the physical layout data 330, the inventory management module 324 may determine that a particular display device 126 is within a field of view 130 of a particular camera 120(1). Continuing the example, the inventory management module 324 may determine that the image data 334 acquired by the camera 120(1) does not include the optical timestamp 128, indicating a fault such as a misalignment of the camera 120(1) or errors in the physical layout data 330. In another implementation, given the physical layout data 330 in a known position of a display device 126, presentation of the optical timestamp 128 may also be used to provide for spatial calibration of the camera 120(1).

At 708, the camera 120(1) acquires image data 334 including image 336 of a scene that may include at least a portion of the optical timestamp 128. For example, as shown in the scenario 700, the image 336 may include one or more of the computer readable codes of the encoded time data 344.

At 710, the image data 334 may be processed by the camera synchronization module 328. For example, the camera synchronization module 328 may detect the optical timestamp 128 within the image 336. The camera synchronization module 328 may then decode the encoded time data 344 within the optical timestamp 128 to produce decoded time data 348. The decoded time data 348 may then be used for further processing of the image data 334.

Illustrative Processes

Figure 8:
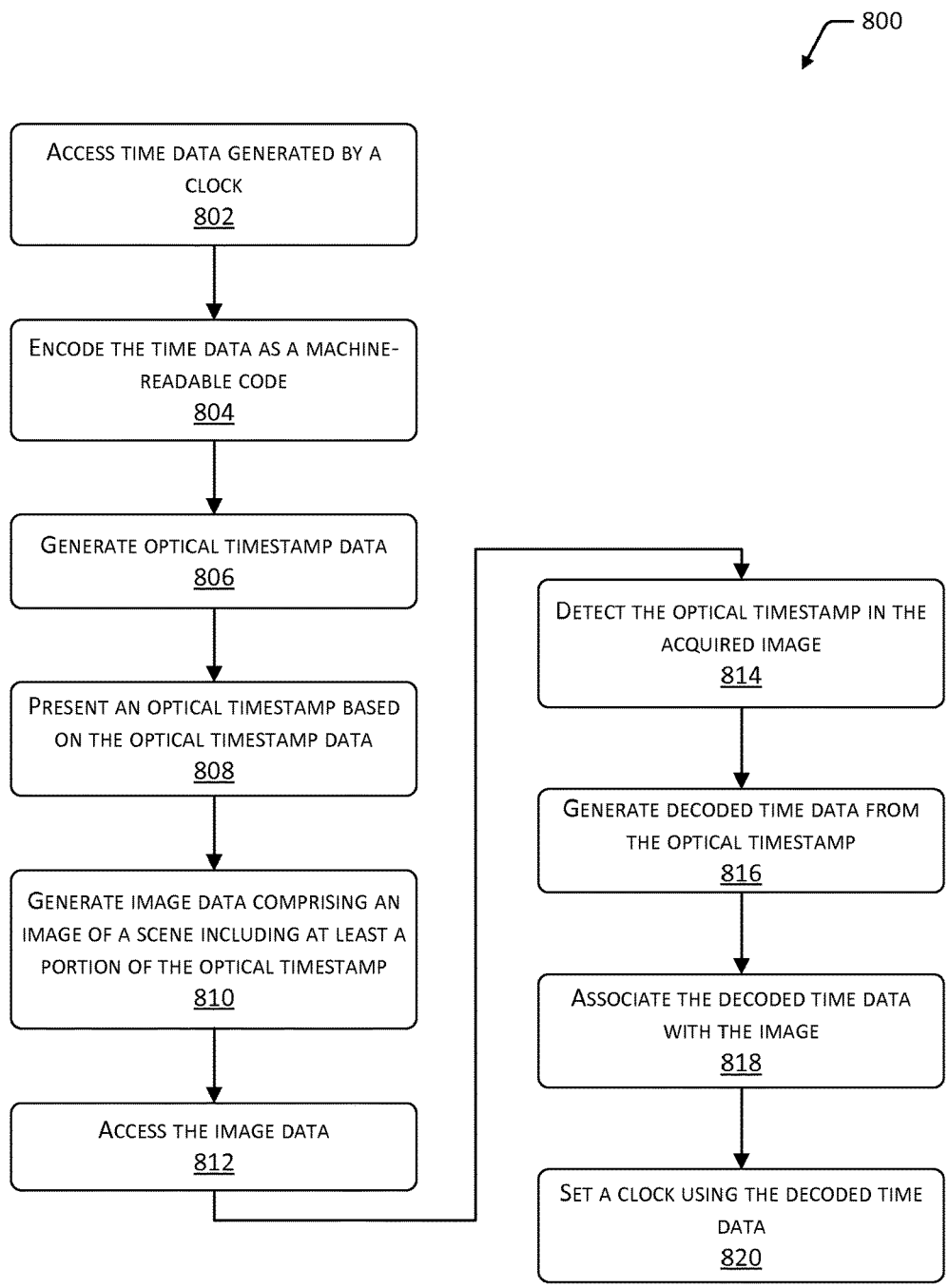
FIG. 8 depicts a flow diagram of a process for utilizing optical timestamps, according to some implementations.

FIG. 8 depicts a flow diagram 800 of a process for utilizing optical timestamps 128, according to some implementations. In some implementations, the process may be implemented at least in part by the camera synchronization module 328. The camera synchronization module 328 may be configured to execute on one or more processors, such as on the server 204 or on the camera 120(1).

Block 802 accesses time data 342 generated by the first clock. The time data 342 may be indicative of one or more of years, days, hours, minutes, seconds, milliseconds, ticks, counts, and so forth. The time data 342 may be relative to a designated epoch or a counter value. For example, the designated epoch may be relative to Jan. 12, 1997 at 09:00:00.00 and the time data 342 may indicate a number of elapsed intervals since that epoch. In another example, the time data 342 may be represented by a value less than or equal to 8 bits in length. For example, an 8 bit counter may be used to generate the time data 342, or an 8 bit value may be generated from the time data 342. The 8 bit value may represent a portion or a fraction of a second. For example, a single second may be divided into 256 timeslots or intervals, with the 8 bit value indicating a particular one of those timeslots.

Block 804 encodes the time data 342 as a machine-readable code to form encoded time data 344. For example, machine-readable code may comprise a two-dimensional matrix code, such as a QR code.

Block 806 generates an optical timestamp 128. The optical timestamp 128 may comprise one or more duplicates of the encoded time data 344. For example, the optical timestamp 128 may include a plurality of the same two-dimensional matrix code. By including a plurality of representations of the encoded time data 344, the likelihood the image 336 is acquired by the camera 120(1) may be increased. In some implementations, the optical timestamp 128 may include other data. For example, the optical timestamp 128 may include a display identifier indicative of display device 126 presenting the optical timestamp 128.

In some implementations, the optical timestamp 128 may include a plurality of different encoded time data 344, or indicia thereof. Continuing the previous example, the optical timestamp 128 may contemporaneously include first encoded time data 344(1) encoded time data 342 of a particular second and second encoded time data 344(2) encoded time data 342 of a particular millisecond or other interval within the particular second. As a result, over time a series of optical timestamps 128 may thus include different combinations of encoded time data 342, such as over the span of the particular second, the same barcode of the first encoded time data 344(1) may be presented, while the encoded time data 342 changes to indicate the particular millisecond or interval.

In some implementations the presentation of a plurality of encoded time data 344 or other indicia may be used to synchronize a refresh rate of the display device 126 with the frame rate of the camera 120(1). Returning to the example in the previous paragraph, the first encoded time data 344(1) representing a particular second may be presented by the display device 126 for one second (1000 ms), and the second encoded time data 344(2) representing 10 ms intervals of the particular second may be updated and presented at 10 ms intervals. The cameras 102(1), may acquire images at the frame rate, such as 20 frames per second (one frame every 50 ms). By detecting the (relatively) long duration first encoded time data 344(1) that is intended to span several frames of image data 334, and using the second encoded time data 344(2), a differential between the timing of presentation by the display device 126 and the image acquisition by the cameras 120(1) may be determined. This differential may then be used to adjust the timing of one or more of the display device 126 or the camera 120(1) such that the second encoded time data 344(2) as present in images 336 across a given period of time indicates intervals of 50 ms.

In another implementation detection of a partial optical timestamp 128 may be used to synchronize operation of the camera 120(1) and the display device 126. For example, detection of the first encoded time data 344(1) and failure to decode the second encoded time data 344(1) may indicate that timing of the camera 120(1) frame rate is leading or lagging the refresh rate of the display device 126. Continuing the example, the second encoded time data 344(1) may fail to decode as a result of only being partially presented, such as may occur when the image 336 is acquired over a period of time that is less than the refresh interval.

Block 808 presents the optical timestamp 128. For example, where the display device 126 comprises an image projector 126(2), the presentation may comprise projecting, onto a scene, an image of the optical timestamp 128 using the image projector 126(2). In some implementations, the image projector 126(2) or other display device 126 may be configured to present the optical timestamp 128 using IR light or such that the optical timestamp 128 is visible within IR wavelengths.

The display device 126 may be configured to present output at a certain rate, sometimes known as a "refresh rate". The refresh rate may indicate how quickly or frequently the display device 126 may change from presenting a first image to a second image that differs from the first. For example, an LCD display or MEMS image projector may be able to present a different image about every $\frac{1}{60}^{th}$ of one second, or about every 16 ms. In some implementations, the display device 126 may be configured to provide a refresh rate of 70 ms or less. As a result, the display device 126 may be able to present optical timestamps 128 having features such as encoded time data 344 that change more quickly than may be perceptible to a human eye.

The camera 120(1) may be configured to acquire images 336 of a certain rate, sometimes known as a "frame rate". For example, the camera 120(1) may be able to acquire 30 images 336 per second, thus having a frame rate of 30 frames per second (FPS).

In one implementation, the display device 126 such as an image projector 126(2) may be configured to project the image of the optical timestamp 128 for a duration of at least twice a frame acquisition time of the camera 120(1) used to produce the image 336 of the scene. For example, the image projector 126(2) may be configured to present the optical timestamp 128 for $\frac{2}{30}^{th}$ of one second (~66 ms) when the camera 120(1) operates at 30 FPS.

In another implementation, the display device 126 such as an image projector 126(2) may be configured to project the image of the optical timestamp 128 for a duration less than that of the frame acquisition time of the camera 120(1). For example, the image projector 126(2) may be configured to present the optical timestamp 128 for $\frac{1}{30}^{th}$ of one second (~33 ms) when the camera 120(1) operates at 20 FPS.

In one implementation, the display device 126 may comprise a light array 126(3). The light array 126(3) may include a plurality of light emissive elements, such as LEDs. As described above, each of emissive elements may be independently addressable to be activated or deactivated. The presentation of the optical timestamp 128 may comprise one or more of a particular pattern of activated light emissive elements, or a particular wavelength of light emitted by the emissive.

In some implementations, the 3D sensors 120(2) may be used to present the optical timestamp 128. For example, the display device 126 may comprise a depth camera configured to produce a structured light pattern. The structured light pattern comprises a known arrangement of features that are projected onto a scene. For example, the structured light pattern may comprise squares or dots. The depth camera may include a camera configured to acquire an image of the scene, including the structured light pattern as it interacts with the objects in the scene. By determining a displacement between the expected known arrangement and the actual arrangement of the features in the image of the scene, information such as distance, shape, and so forth may be generated. The structured light pattern may be generated using one or more of the display devices 126 described below. For example, the structured light pattern may be generated using a light source and an array of MEMS-controlled mirrors. In some implementations, the structured light pattern (such as the location of the features therein) may be generated using a random or pseudorandom number generator. In other implementations the structured light pattern may comprise a regular pattern, such as a rows and columns of equidistance lines or squares.

The structured light pattern may comprise at least in part the optical timestamp 128. For example, the structured light pattern may be the optical timestamp 128. In another example, the structured light pattern may be modified to encode the optical timestamp 128.

As described above, the optical timestamp 128 may be presented in its entirety at a single point in time or within the time associated with a refresh rate of the display device 126. In some implementations, the optical timestamp 128 may comprise a time-varying pattern or series of signals that are required across a plurality of images 336. For example, the optical timestamp 128 encoding 8 bit time data 342 may be encoded and presented as a time varying activation of a single emissive device such as an LED. Continuing the example, where the camera 120(1) has acquires images 336 at 30 FPS, to encode "10010111" a single LED may be activated in this series and with the following durations: on for 33 ms, off for 33 ms, off for 33 mm, on for 33 mm, off for 33 mm, on for 33 mm, on for 33 mm, on for 33 mm. The light emitted by the LED may be detected in 8 successive images 336, and the decoded time data 348 may be generated.

Block 810 generates image data 334 comprising an image 336 of a scene including a least a portion of the optical timestamp 128.

Block 812 accesses the image data 334 of the scene. For example, the acquired image 336 may be retrieved. As described above, the image 336 may include at least a portion of the image of the optical timestamp 128.

Block 814 detects the optical timestamp 128 in the image 336. For example, an image processing module may be configured to determine one or more visible features of the optical timestamp 128 are present in the image 336, such as a particular light and dark pattern.

Block 816 generates decoded time data 348 from the encoded time data 344 as presented in the optical timestamp 128. For example, the decoded time data 348 may comprise a value such as a decimal string.

Block 818 associates the decoded time data 348 with the image 336. For example, the image data 334 may be amended to include the decoded time data 348. In another example, the decoded time data 348 may replace the image timestamp 340.

In some situations, the optical timestamp 128 may span the acquisition of the plurality of images 336. For example, the optical timestamp 128 may be presented for an interval of time corresponding to the acquisition of a first image 336(1) and a second image 336(2). As a result, the same value of decoded time data 348 may be determined by the camera synchronization module 328 for the images 336(1) and 336(2). Thus, the camera synchronization module 328 may determine the same decoded time data 348 is present in the plurality of images 336. In one implementation, the camera synchronization module 328 may associate the decoded time data 348 with the first image 336(1). In another implementation, the decoded time data 348 may be associated with the later acquired image, such as the second image 336(2). In yet another implementation, time variance data 350 may be generated as described above, and used to determine a corrective value. For example, the time variance data 350 may be divided by two and added and subtracted to the decoded time data 348 value and used for the first image 336(1) and the second image 336(2), respectively.

Block 820 sets a clock based at least in part on the decoded time data 348. For example, the clock of the camera 120(1), the clock 306 of the server, or another clock may be set based on the decoded time data 348. For example, the decoded time data 348 may be added to a time value indicative of processing time used to determine decoded time dated 348, and the resulting sum may be used to set the clock. Continuing the example, time value indicative of the processing time may represent the latency of a processing pipeline to generate the decoded time data 348.

In some implementations, the decoded time data 348 may be used to synchronize acquisition of the image data 334 by the camera 120(1). For example, the camera 120(1) may be configured to time the acquisition of the image data 334 based at least in part on the current time from the clock of the camera 120(1). The clock of the camera 120(1) may be set using the decoded time data 348 as described above. As a result, the timing of the acquisition of image data 334 and the presentation of the optical timestamp 128 may be coordinated to occur contemporaneously.

In some implementations, a block (not shown) may be configured to determine a current time using the clock. For example, the current time may comprise time data 342 obtained from the clock 306. Time variance data 350 indicative of a variance between the decoded time data 348 and the time data 342 may be determined. The time variance data 350 may then be associated with one or more of the camera identifier 338 or the image data 334. For example, time variance data 350 may be used to generate calibration data 352 that may subsequently be used by the inventory management module 324 to adjust the image timestamp 340 of image data 334.

A block (not shown) may be configured to generate diagnostic data indicative of operation of a camera 120(1) or another portion of the system 100 that processes image data 334. In implementations where the optical timestamp 128 includes encoded time data 344 that is changing, such as a series of successively increasing time data 342 values, successive determinations of duplicate decoded time data 348 may be indicative of a failure.

Diagnostic data may be generated by determining the same decoded time data 348 is present in at least a portion of a plurality of images 336. For example, images 336(1)-(30) may have the same value of encoded time data 344 of "01000101". Given the situation where the optical timestamp 128 is presented as an interval less than or equal to a frame rate of the camera 120(1) and where the optical timestamp 128 encodes changing time data 342, the pattern of decoded time data 348 indicating duplicate values exceeding a threshold count may be indicative of a failure. For example, a camera 120(1) may develop a software or hardware fault that results in an identical image 336 being provided to the server 204, such as a "stuck" camera 120(1). By analyzing the decoded time data 348 and the associated camera identifier 338, diagnostic data associated with the camera identifier 338 may be generated.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
 a timestamp device comprising:
  a first clock;
  an image projector;
  a first memory, storing first computer-executable instructions; and
  a first hardware processor configured to execute the first computer-executable instructions to:
   access time data generated by the first clock;
   encode the time data as a machine-readable code;
   generate optical timestamp data comprising one or more duplicates of the machine-readable code;
   send instructions to the image projector to project, onto a scene, an image of an optical timestamp based on the optical timestamp data; and
 an image processing server comprising:
  a second memory, storing second computer-executable instructions; and
  a second hardware processor configured to execute the second computer-executable instructions to:
   access an acquired image of the scene, wherein the acquired image includes the projected image of the optical timestamp;
   detect the optical timestamp in the acquired image;
   decode the optical timestamp to determine decoded time data; and
   associate the decoded time data with the acquired image.

2. The system of claim 1, wherein the image projector is configured to project the image of the optical timestamp using infrared light; and
 wherein the machine-readable code comprises a two-dimensional matrix code.

3. The system of claim 1, wherein the time data is indicative of milliseconds relative to one or more of a designated epoch or a counter; and further comprising second computer-executable instructions to:
 decode the optical timestamp to determine a timestamp device identifier indicative of the timestamp device; and
 associate the timestamp device identifier with the acquired image.

4. The system of claim 1, wherein the image projector is configured to project the image of the optical timestamp for a duration of at least twice a frame acquisition time of a camera used to produce the acquired image of the scene.

5. A system comprising:
 a clock;
 a communication interface;
 a display device;
 a memory, storing computer-executable instructions; and
 at least one hardware processor configured to execute the computer-executable instructions to:
  access time data generated by the clock;
  encode the time data as a machine-readable code;
  generate optical timestamp data comprising the machine-readable code;
  present, using the optical timestamp data, an optical timestamp using the display device;
  access an acquired image that includes a representation of the optical timestamp;
  detect the representation of the optical timestamp in the acquired image;
  decode the representation of the optical timestamp to determine decoded time data; and
  associate the decoded time data with the acquired image.

6. The system of claim 5, wherein the display device comprises one or more of an addressable display comprising a plurality of pixel display elements or projector.

7. The system of claim 5, wherein the display device is configured to present the optical timestamp on or within a floor.

8. The system of claim 5, wherein the display device comprises a plurality of discrete light emissive elements separated from one another by at least 0.5 centimeters, wherein each of the plurality of light emissive elements is independently addressable to be activated or deactivated, and further wherein the optical timestamp comprises one or more of a pattern of activated light emissive elements or a wavelength of light emitted by the emissive elements.

9. The system of claim 5, wherein the display device is configured to produce a structured light pattern, and wherein the structured light pattern comprises the optical timestamp.

10. The system of claim 5, wherein the machine-readable code comprises a two-dimensional matrix code, and further wherein the optical timestamp comprises multiple presentations of the same two-dimensional matrix code.

11. The system of claim 5, wherein the time data is represented by a counter value less than or equal to 8 bits in length.

12. The system of claim 5, further comprising a camera configured to acquire images at a rate of at least one image per a first time interval; wherein the display device is configured to present the optical timestamp for a duration of at least twice the first time interval.

13. The system of claim 5, further comprising a camera configured to acquire images at a rate of at least one image per a first interval of time; wherein the display device is configured to present the optical timestamp for a duration less than the first time interval.

14. A system comprising:
 a clock;
 a communication interface;
 a memory, storing computer-executable instructions; and
 a hardware processor configured to execute the computer-executable instructions to:
  access image data;
  detect a machine-readable code in the image data;
  decode the machine-readable code to determine decoded time data; and
  associate the decoded time data with the image data.

15. The system of claim 14 the computer-executable instructions configured to:
 set the clock based at least in part on the decoded time data.

16. The system of claim 14, further comprising a camera; and the computer-executable instructions are configured to:
   acquire the image data using the camera, wherein timing of the acquisition by the camera is based at least in part on current time from the clock; and
   set the clock based at least in part on the decoded time data.

17. The system of claim 14, wherein the image data comprises a camera identifier; and the computer-executable instructions configured to:
   determine a current time using the clock;
   determine a variance between the decoded time data and the current time; and
   associate the variance with the camera identifier.

18. The system of claim 14, wherein the image data comprises a plurality of images; and the computer-executable instructions are configured to:
   determine the same decoded time data is present in the plurality of images; and
   associate the decoded time data with a first of the plurality of images acquired.

19. The system of claim 14, wherein the image data comprises a plurality of images and a camera identifier associated with the plurality of images; and the computer-executable instructions are configured to:
   determine the same decoded time data is present in at least a portion of the plurality of images; and
   generate diagnostic data associated with the camera identifier.

20. The system of claim 14 wherein the machine-readable code comprises a two-dimensional matrix code, and further wherein the optical timestamp comprises multiple presentations of the same two-dimensional matrix code.

21. A system comprising:
   a camera;
   one or more sensors associated with the camera;
   a memory, storing computer-executable instructions; and
   a hardware processor configured to execute the computer-executable instructions to:
      detect a machine-readable code in image data acquired by the camera;
      determine decoded data based on the machine-readable code;
      determine time data based on the decoded data;
      obtain sensor data from the one or more sensors; and
      associate the time data with the sensor data.

* * * * *